United States Patent Office 3,272,882
Patented Sept. 13, 1966

3,272,882
PREPARATION OF β-PHENYLNAPHTHALENE
John J. van Venrooy, Wyncroft, Media, Pa., assignor to Sun Oil Company, Philadelphia, Pa., a corporation of New Jersey
No Drawing. Filed Dec. 20, 1963, Ser. No. 332,298
2 Claims. (Cl. 260—668)

This invention relates to the preparation of β-phenylnaphthalene by contacting water with β-chlorostyrene at elevated temperature.

According to the invention β-chlorostyrene is contacted with water at a temperature above 225° C., whereby β-phenylnaphthalene is formed as the main reaction product. Hydrogen chloride is a by-produce of the reaction and also minor amounts of other organic products are formed. There is no net consumption of water in the reaction and hence the water in effect functions as a catalyst and as a medium for absorbing the by-product hydrogen chloride. The main reaction can be depicted as follows:

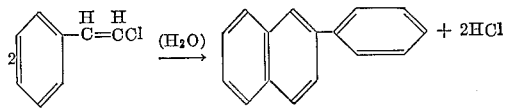

The β-phenylnaphthalene when purified is a colorless crystalline hydrocarbon having a melting point of about 102° C.

The reaction of the present invention can be carried out merely by contacting β-chlorostyrene with water in liquid phase at a temperature in the range of 225–400° C., more preferably 240–300° C. The contacting can be done, fore example, batchwise in a stirred autoclave or continuously in a tubular reactor. The specified high temperature is important as no reaction will occur if the temperature is too low e.g., 170° C.). Preferably at least an equal volume of water is used relative to the β-chlorostyrene. The time of reaction will vary considerably depending upon the temperature employed and is not critical, ranging from 5 minutes to 24 hours. Generally it is desirable to allow sufficient contact time to effect substantially complete conversion of the β-chlorostyrene.

After the reaction is complete, the water layer containing by-product hydrogen chloride is separated from the organic phase. The latter is composed largely of β-phenylnaphthalene in admixture with minor amounts of other products. The β-phenylnaphthalene can be separated from the other products and obtained in high purity by selective crystallization from a suitable solvent such as ethyl alcohol.

The following example illustrates the invention more specifically:

A 200 ml. Hastalloy bomb was charged with 10 ml. of β-chlorostyrene and 50 ml. of water. The mixture was heated to 250° C. and held at that temperature for 12 hours while the bomb was being shaken. The maximum pressure reached in the bomb was about 500 p.s.i.g. The reaction mixture was then extracted with ethyl ether and the ether layer was separated from the water layer. The ether layer was dried by means of magnesium sulfate and the ether was evaporated, leaving a brown solid residue. Analysis of the residue by vapor phase chromatography, infrared and nuclear magnetic resonance showed that this product contained, by weight, 86.4% of β-phenylnaphthalene and 13.6% other material not identified. No unconverted β-chlorostyrene was detected. The yield of β-chlorostyrene based on theoretical was about 82%. By recrystallization of the product from ethanol colorless crystalline β-phenylnaphthalene was obtained which melted at 101–102° C.

When the foregoing experiment was repeated except that the reaction temperature was reduced to about 170° C., essentially no reaction was obtained. Also when β-bromostyrene was substituted for β-chlorostyrene and reacted at 250° C., no β-phenylnaphthalene was identified in the product.

I claim:
1. Method of making β-phenylnaphthalene which consists essentially of treating β-chlorostyrene with a non-acidic aqueous medium at a temperature in the range of 225 to 400° C.
2. Method according to claim 1 wherein the temperature is in the range of 240 to 300° C.

References Cited by the Examiner
UNITED STATES PATENTS 3,047,643  7/1962  Corson et al. _____ 260—668
3,197,518  7/1965  Chapman et al. _____ 260—668

OTHER REFERENCES
Von Auwers: Chemische Berchte 36, 3902 (1903).

DELBERT E. GANTZ, *Primary Examiner.*

C. R. DAVIS, *Assistant Examiner.*

UNITED STATES PATENT OFFICE
CERTIFICATE OF CORRECTION

Patent No. 3,272,882                                         September 13, 1966

John J. van Venrooy

It is hereby certified that error appears in the above numbered patent requiring correction and that the said Letters Patent should read as corrected below.

Column 1, line 35, for "fore" read -- for --; column 2, line 21, for "β-chlorostyrene" read -- β-phenylnaphthalene --.

Signed and sealed this 29th day of August 1967.

(SEAL)
Attest:

ERNEST W. SWIDER                                                   EDWARD J. BRENNER
Attesting Officer                                                          Commissioner of Patents